United States Patent
Noble et al.

(10) Patent No.: US 7,185,066 B2
(45) Date of Patent: Feb. 27, 2007

(54) SECURE DATA SHARING SYSTEM

(75) Inventors: William B. Noble, Santa Monica, CA (US); Elizabeth R. Mayerski, Aliso Viejo, CA (US); Hiep T. Vu, Corona, CA (US)

(73) Assignee: Raytheon Company, Waltham, MA (US)

( * ) Notice: Subject to any disclaimer, the term of this patent is extended or adjusted under 35 U.S.C. 154(b) by 586 days.

(21) Appl. No.: 09/975,423

(22) Filed: Oct. 11, 2001

(65) Prior Publication Data

US 2003/0074406 A1 Apr. 17, 2003

(51) Int. Cl.
*G06F 15/16* (2006.01)
*G06F 17/00* (2006.01)

(52) U.S. Cl. .................. 709/217; 709/232; 707/9; 707/10

(58) Field of Classification Search ........ 709/213–216, 709/217–219, 223–226, 248; 711/147–153; 710/33; 707/1–10
See application file for complete search history.

(56) References Cited

U.S. PATENT DOCUMENTS

| | | | |
|---|---|---|---|
| 5,297,208 A | 3/1994 | Schlafley et al. | |
| 5,483,596 A | 1/1996 | Rosenow et al. | |
| 5,513,126 A | 4/1996 | Harkins et al. | |
| 5,720,035 A | 2/1998 | Allegre et al. | |
| 5,950,014 A * | 9/1999 | Hickerson et al. | 709/219 |
| 6,026,430 A | 2/2000 | Butman et al. | |
| 6,034,621 A * | 3/2000 | Kaufman | 340/7.21 |
| 6,044,372 A * | 3/2000 | Rothfus et al. | 707/10 |
| 6,128,645 A | 10/2000 | Butman et al. | |
| 6,330,618 B1 * | 12/2001 | Hawkins et al. | 709/248 |
| 6,529,956 B1 * | 3/2003 | Smith et al. | 709/229 |
| 6,571,245 B2 * | 5/2003 | Huang et al. | 709/218 |
| 6,598,130 B2 * | 7/2003 | Harris et al. | 709/214 |
| 6,721,787 B1 * | 4/2004 | Hiscock | 709/217 |
| 6,728,786 B2 * | 4/2004 | Hawkins et al. | 709/248 |
| 7,076,736 B2 * | 7/2006 | Hugh | 715/743 |
| 2002/0026493 A1 * | 2/2002 | Scardamalia et al. | 709/213 |
| 2002/0071559 A1 * | 6/2002 | Christensen et al. | 380/277 |
| 2002/0120696 A1 * | 8/2002 | Mousseau et al. | 709/206 |
| 2006/0206246 A1 * | 9/2006 | Walker | 701/16 |

OTHER PUBLICATIONS

Smith, R. "MLS File Service for Network Data Sharing" IEEE Computer Security Applications Conference, 1993. Proceedings, Ninth Annual pp. 94-99.*
Stillman et al. "Computer Security and Networking Protocols: Technical Issues in Military Data Communications Networks" IEEE Transactions on Communications, vol. COM-28, No. 9, Sep. 1980.*

(Continued)

*Primary Examiner*—Jeffrey Pwu
*Assistant Examiner*—Joseph E. Avellino
(74) *Attorney, Agent, or Firm*—Daly, Crowley, Mofford & Durkee, LLP (57) ABSTRACT

A system for sharing computer data between two or more sharing partners. The system includes copying of first private data from a first private data memory of a first sharing partner, to a first shared data memory associated with the first sharing partner. The system further includes a replication of the first shared data from the first shared data memory to a second shared data memory associated with a second sharing partner.

17 Claims, 6 Drawing Sheets

OTHER PUBLICATIONS

Army Battle Command System (ABCS) FAS Military Analysis Network www.fas.org/man/dod-101/sys/land/abcs.htm Feb. 21, 1999.*

Pike et al. (Defense Data Network, Defense Secure Network; FAS Intelligence Resource Program; Feb. 11, 2000 http://www.fas.org/irp/program/disseminate/ddn.htm).*

* cited by examiner

SECURE DATA SHARING SYSTEM

CROSS REFERENCE TO RELATED APPLICATIONS

Not Applicable.

Statement Regarding Federally Sponsored Research

Not Applicable.

Field of the Invention

This invention relates generally to sharing data between computer systems and, more particularly, to systems for allowing secure sharing of data.

BACKGROUND OF THE INVENTION

As is known in the art, networks have been created that allow generalized sharing of data between computer platforms. One typical arrangement for data sharing includes a central server computer that contains data in memory and one or more client computers in direct communication with the server. When the client computers are in close proximity to the server, this type of network is generically referred to a local area network (LAN). The client computers have direct access to the data on the central server and can generally both write and read data to and from the central server memory. Each client computer has access privileges that allow the client to alter a given data file that resides on the server.

In local area network client/server systems, the central server controls the general access privileges of client computers. Typically, each client must log on to the server for access to central server data. For example, each client may need a username and a password. The central server can further restrict access to particular memory locations or particular files that reside on the central server.

Some software applications have a provision that prohibits the user of a second client computer from altering a given data file on the central server while the user of a first client computer has opened the file for viewing or editing. For example, most word processing application programs allow read-only access by client computers to a file that is open for editing by one client computer. This simple type of file access management system is not optimal where it is desired that the multiple client computers have simultaneous editing access to a file. This system is also not optimal where data file security is an issue, since a user of any one client computer can incorrectly alter a file.

In some instances, it is desirable for several client computers to have editing access to a given file on the central server simultaneously. As is known to one of ordinary skill in the art, file management application software has been created for managing the conflicts that can occur in accessing a file when the file of interest resides on a central server and multiple client computers need full editing access to the file at the same time. For example, file management systems typically used for software development can allow multiple client computers to access a given file on the central server, edit the file individually, and "merge" the multiple edits back into the original file. Thus, the individual edits done by the multiple client computers are all merged back into the original file that resides on the central server. This type of file management application software resides on the central server.

Other types of access restriction include connection between client computers and a central server through an Internet web browser. Data communication protocols associated with web browser software control the access that client computers can have to data on the central server. The central server contains Internet Protocol (IP) "socket" software that primarily allows an Internet connection, and can secondarily be used to restrict access to include only remote client computers that have certain IP addresses.

It will be recognized by one of ordinary skill in the art that all of the above examples can depict either a LAN with a central server in proximity to one or more client computers, or a wide area network (WAN) with a central server geographically remote from the one or more client computers. In data sharing systems where the central server is remote from the client computers, the central server can still control the access by the same method described above in association with a LAN.

For certain applications, a central server does not provide sufficient security of sensitive data. For example, military data which is intended to be shared among friendly countries is data for which enhanced protection is desired. The various sharing countries may want to share data, and provide security for their respective central data bases. A central server alone, placed in only one of a group of countries can be vulnerable to interception of data that is intended for only a sub-set of the members of the group. A central server can be subject to data file corruption, data file tampering, and data file interception, particularly from the country in which the server resides.

It would therefore be desirable to provide a data sharing system in which shared data is stored at each respective sharing site. It would further be desirable to provide a data sharing system in which remote computer systems have selective control that provides the ability to select those sharing partners to whom data will be shared. It would be further desirable to provide a data sharing system in which each data file can be selectively shared to different sharing partners.

SUMMARY OF THE INVENTION

In accordance with the present invention, a method for sharing data between sharing partners includes storing private data within a private data memory associated with a first sharing partner. The first sharing partner selects a private data portion, and further selects one or more sharing partners with whom to share the private data portion. The private data portion is then replicated as a replicated copy to the selected sharing partners.

In accordance with a further aspect of this invention, the method for secure data sharing includes secure data links between the first sharing partner and the one or more selected sharing partners in which the private data portion is first copied to a first shared memory associated with the first sharing partner, then replicated via "write-only" data paths to shared memories associated with each of the one or more selected sharing partners.

With this particular arrangement, the secure data sharing method provides a secure transfer of data between the first sharing partner and the selected one or more sharing partners.

In accordance with another aspect of this invention, a data sharing apparatus includes a first sharing partner having a first client computer and a first sharing partner server coupled to the first client computer. The data sharing apparatus also includes one more selected sharing partners associated with the first sharing partner. A respective one of the one or more selected sharing partners has a second client computer and a second sharing partner server coupled to the second client computer. The first sharing partner server is provided having a first private data memory and a first shared data memory. The second sharing partner server is similarly provided having a second private data memory and a second shared data memory. A shared memory write-only data path is provided that couples the first shared data memory to the second shared data memory. Alternatively, a private memory write-only data path is provided that couples the first private data memory to the second shared data memory.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

While the invention is primarily shown and described in conjunction with a system for sharing military data, it is understood that the invention is generally applicable to systems in which selective data sharing among a plurality of entities is desirable. In addition, military terms used to describe exemplary embodiments to facilitate an understanding of the invention should not be construed to limit the invention.

Before describing the invention, some introductory concepts and terminology are explained below. Since the system can be applied to the sharing of military data, some terminology will be used that refers to particular military data. The term "own data" can be applied to data that describes military information at a particular site of a particular sharing partner. The term "GCC" data pertains to the data that is associated with a particular group of military sharing partners known as the Gulf Cooperative Council (GCC). Enemy and friend (E&F) data pertains to military data both about enemies, and about friends that are not part of the sharing partner group, here the GCC. Order of battle (OOB) data is enemy data. Note that E&F data includes OOB data.

Figure 1A:
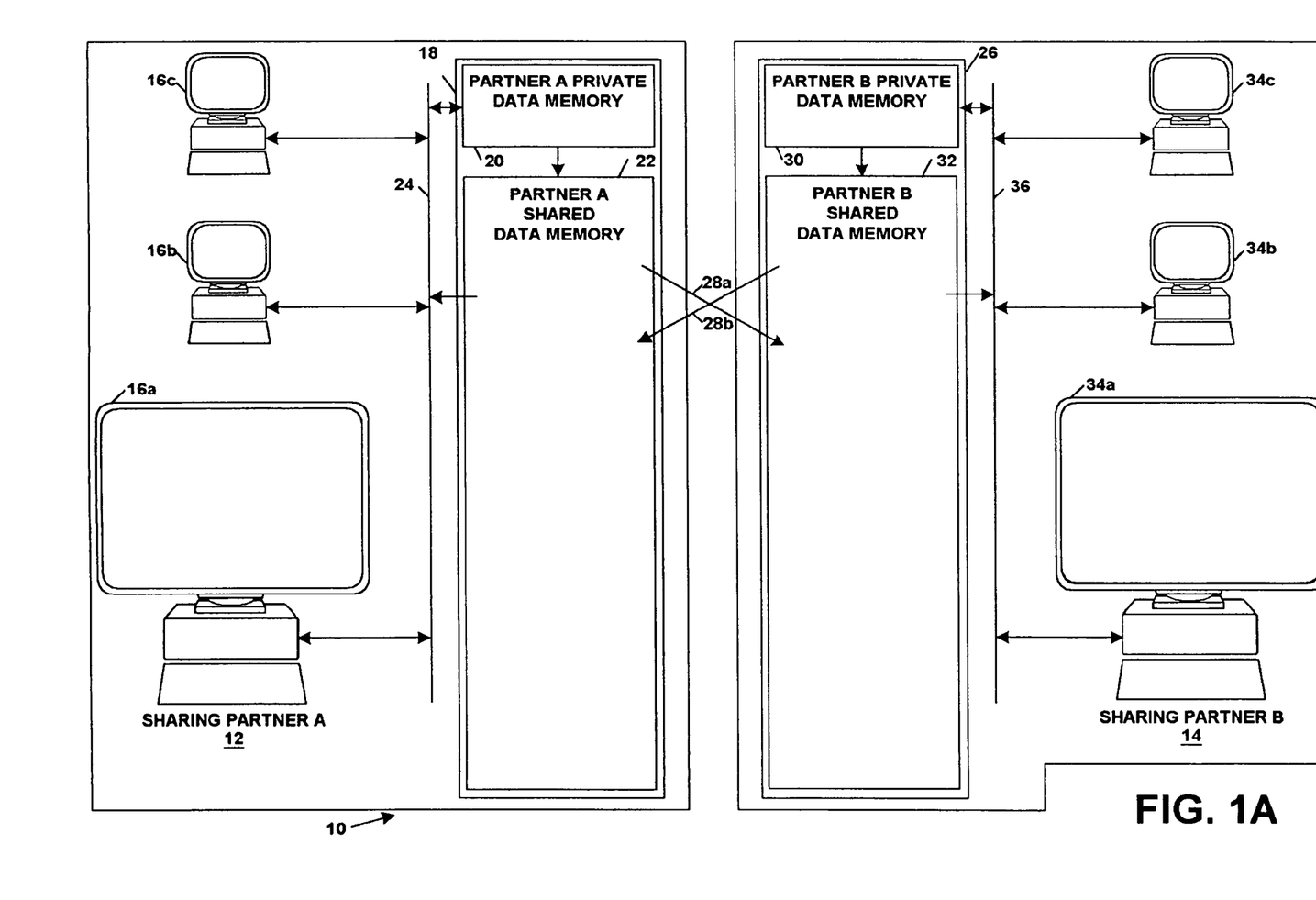
FIG. 1A is a block diagram of a system having secure data sharing in accordance with the present invention.
Figure 1B:
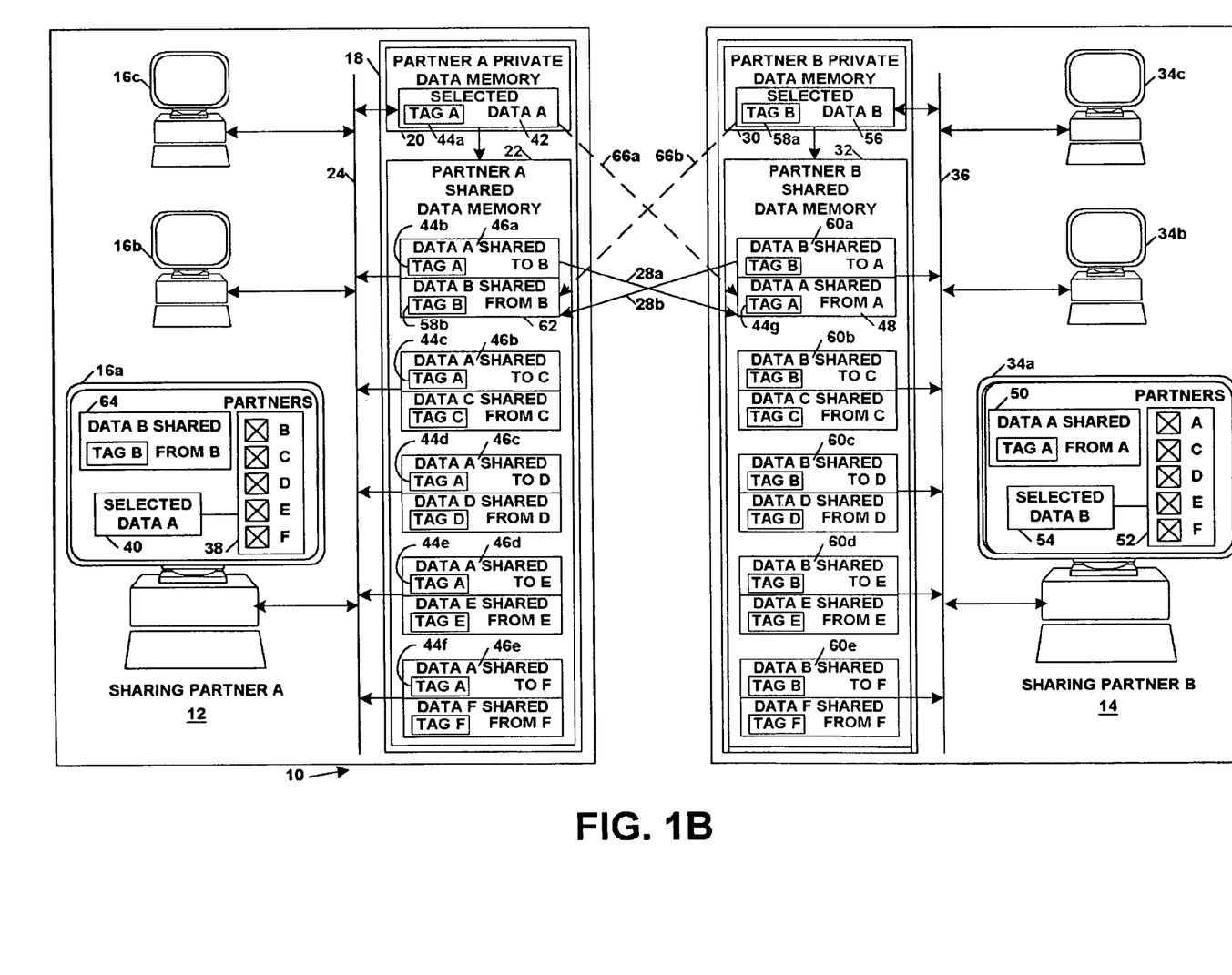
FIG. 1B is a detailed block diagram of the system having secure data sharing shown in FIG. 1A.

Referring to FIGS. 1A and 1B, for which like elements have like reference designations, a system 10 for selective data sharing includes at least two sharing partners, for example, sharing partners A and B 12, 14. Sharing partner A 12 includes one or more client computers, 16, also referred to herein as clients 16, coupled to a partner A server 18. The partner A server 18 includes a partner A private data memory 20 coupled to a partner A shared data memory 22. Client computers 16 are coupled via a data bus 24 to both the client A private data memory 20 and the partner A shared data memory 22.

The partner A server 18, either remote from or in proximity to remote partner B server 26, is coupled to a partner B server 26 with "write-only" data paths 28a, 28b. The partner B server 26 includes a partner B private data memory 30 coupled to a partner B shared data memory 32. More particularly, the partner A shared data memory 22 is coupled to the partner B shared data memory 32 with the "write-only" data paths 28a, 28b. The one or more client computers 34a–34c of sharing partner B are coupled via data bus 36 to both the partner B private data memory 30 and the partner B shared data memory 32.

The sharing of data is selected by system users via the client computers 16, 34. For example, upon selection by a user of a client of sharing partner A, e.g. client 16a, with a graphical user interface, such as a list of check boxes 38 (FIG. 1B), the client 16a shares selected data A 40, with other sharing partners as selected by the graphical user interface 38. Here, the partner A client 16a has selected to share selected data A 40 with other sharing partners B 14, as well as C, D, E, and F (not shown). When a client of sharing partner A 16a selects that data is to be shared, here shown as selected data A 40, the corresponding selected data A 42 that resides in partner A private data memory 20 is tagged with a data tag 44a and is copied into partner A shared data memory 22 as data A shared to B 46a, data A shared to C 46b, data A shared to D 46c, data A shared to E 46d, and data A shared to F 46e, hereafter each called "copied data." This data is then replicated to other sharing partners selected by the graphical user interface 38. For example, data A shared to B 46a is replicated via the "write-only" data path 28a into partner B shared data memory 32 as data A shared from A 48, hereafter generically called "replicated data." Once replicated to partner B shared data memory 32, data A shared from A 48 is available for viewing by the partner B client computers 32, for example as data A shared from A 50. Thus, sharing partners, if selected by the graphical user interface 38, 52 can view the data from the other sharing partners.

Similarly, upon selection by a user of a client of sharing partner B, e.g. client 34a, with a graphical user interface, such as a list of check boxes 52, the client 34a shares selected data B 54 with other sharing partners as selected by the graphical user interface 52. Here, the partner B client 34a has selected to share selected data B with other sharing partners A 12, as well as C, D, E, and F (not shown). When a client 34a selects that data is to be shared, here selected data B 54, the corresponding selected data B 56 that resides in partner B private data memory 30 is tagged with a data tag 58a and is copied into partner B shared data memory 32 as data B shared to A 60a, data B shared to C 60b, data B shared to D 60c, data B shared to E 60d, and data B shared to F 60e. This data is then replicated to other sharing partners selected by the graphical user interface 52. For example, data B shared to A 60a is replicated via "write-only" data path 28b into partner A shared data memory 22 as data B shared from B 62. Once replicated to partner A shared data memory 22, data B shared from B 62 is available for viewing by the partner A client computers 16, for example as data B shared from B 64.

It will be recognized by one of ordinary skill in the art that a variety of graphical user interfaces known to a person of ordinary skill in the art can be used to make the sharing partner selection. It will further be recognized that where FIG. 1B and subsequent figures indicate six sharing partners, this technique is suitable for any number of sharing partners.

Data tags 44*a*, 58*a* are associated with selected data 42, 56 by the graphical user interfaces 38, 52 described above. Data tags are discussed in more detail in association with FIG. 4. Let it suffice here to say that a data tag, for example the data tag 44*a*, can associate selected data, for example selected data A 42, with the sharing partners. Note that data tags can be identical for corresponding selected data, copied data, replicated data, and displayed data. In an illustrative embodiment, corresponding selected data A 42, copied data 46*a*–46*e*, replicated data 48, and displayed data 50, can contain identical data tags 44*a*–44*h*. In another illustrative embodiment, data tags 44*a*–44*h* can be different from each other, and contain information that identifies the source sharing partner and at least one destination sharing partner.

Data tags indicate both the sharing partner that is the source of the data and the sharing partner or partners that are the destination of the data. For example, data tags indicate source partner A for data tags A 44*a*–44*g* and B for data tags B 58*a*–58*b*. Data tags A 44*a*–44*g*, would indicate destination partners B, C, D, E, F and data tags B 58*a*–58*b* would indicate destination partners A, C, D, E, F.

The data tags 44, 58 can be used to allow automatic data sharing updates. For example, since data tag 44*a* is retained along with the selected data A 42 in partner A private data memory 20, by computer recognition of tags 44*a*–44*h*, if a user modifies the selected data A 40, via the client 16*a*, the system can automatically copy new versions 46*a*–46*e* of selected data A 42 to partner A shared memory 22, and can automatically replicate the data as data A shared from A 48 to partner B shared memory 32. The client 34*a* display can automatically update to reflect the modified selected data A 40, for example with a new data A shared from A 50. Once the sharing selection is made with the graphical user interface 38, 52, all data with tags A 44*a*–44*h* can be automatically updated. It is understood that where a sharing partner de-selects the sharing of particular data, for example by un-checking a list of check boxes 38, 52, the particular data that was previously shared can either be nulled to the sharing partner or can be left as originally shared without further updates.

With this arrangement, partner private data memories 20, 30 are secure because the other sharing partners do not have direct access to the private data memory of other sharing partners. Sharing partners have access to data from the other sharing partners only via their respective shared memories 22, 32. For example, the partner A private data memory 20 is not directly accessible by sharing partner B 14. Likewise, partner B private data memory 30 is not accessible by sharing partner A 12. Only the data A shared from A 48 is accessible by sharing partner B 14, and only data B shared from B 62 is accessible by sharing partner A 12. Thus, the actual data of partner A and B private data memories 20, 30 is kept secure from the other sharing partners.

It will be recognized by one of ordinary skill in the art that the replication of data from partner A shared data memory 22 to partner B shared memory 32 can functionally be a pushing of data from partner A 12 to partner B 14. Conversely, the transfer can be accomplished with a pulling of data by partner B 14 from sharing partner A 12. As is known to one of ordinary skill in the art, pushing refers to a data transfer that is initiated by the source sharing partner, and pulling refers to a data transfer that is initiated by the destination sharing partner.

Optionally, it should be noted that partner A private data memory 20 can be directly coupled via an alternative "write-only" data path 66*a* to the partner B shared data memory 32, and the partner B private data memory 30 can be directly coupled via an alternative "write-only" data path 66*b* to the partner A shared data memory 22. This arrangement can be used where data is shared that has different characteristics and/or different security requirements. The alternative "write-only" data paths 66*a*, 66*b* provide less data security for data retained in the private data memories 20, 30 than the secure write-only data paths 28*a*, 28*b*. The alternative "write-only" data paths 66*a*, 66*b*, connect the private data memories 20, 30 directly to the outside world where the alternative write-only data paths, even though not bidirectional, can still provide a pathway by which others could manipulate private data memories 20, 30.

As is well known in the art, privacy of data is generally important, and particularly for military applications. With the secure data sharing system, friendly countries, for example countries within the Gulf Cooperative Council (GCC), can share data about the position of military assets and personnel, while maintaining private control of their private data memories.

In general, military data can fall into several known categories, each of which can have different sharing characteristics. As mentioned above, the secure data sharing system can be used with sharing partners such as those of the GCC. Also as mentioned above, data may indicate own data, GCC data, E&F data, or OOB data.

In general, it is desirable that own data and other GCC data be shared only by the sharing partner that is the origin of the data, i.e. its own data. Otherwise, data conflicts might occur. For example, a data conflict might occur if sharing partner A were to report its own data to sharing partner B, and sharing partner B were to then subsequently report sharing partner A data with changes to sharing partner C. Thus, in the exemplary secure data sharing system, only own data can be shared to others, and the data from other GCC sharing partners can only be received from others.

Unlike own data and other GCC data, E&F data and OOB data may have no inherent primary source among the sharing partners. Data about enemy troops and assets or data about troops and assets of friendly countries not within the GCC can be obtained by the intelligence resources of any of the GCC members. Such data might come into conflict if obtained and presented for sharing by more than one sharing partner. Furthermore, data from different intelligence sources might not agree. Though unlikely, it is possible for such data to be presented by more than one sharing partner simultaneously. Thus, the exemplary secure data sharing system can rely upon data sharing rules to prevent data conflicts pertaining to E&F and OOB data sharing. In one embodiment, a doctrine can be applied in which E&F and OOB data are provided to one member of the group of sharing partners by a group of associated intelligence data gathering entities, where the one sharing partner member is then designated to be the permanent source sharing partner for sharing of all E&F and OOB data. As known to a person of ordinary skill in the art, a doctrine is a system policy that can be applied either through software functions of through a manual system set of guidelines that all sharing partners must follow.

In an alternative embodiment, a single E&F and OOB source sharing partner can be assigned in rotation monthly.

In a further embodiment, a doctrine can be established in which the E&F and OOB source sharing partner is not pre-assigned by time, and only the source sharing partner that acquired the particular data can share and subsequently update the particular E&F and OOB data. Under this doctrine, the data tag associated with the E&F data can include the identity of the source sharing partner. Particular E&F or OOB data can be associated with a single source sharing partner at the first entry of the particular E&F or OOB data. Thereafter, the data tag identifies that only the source sharing partner thus associated with particular E&F or OOB data can subsequently update or modify the particular E&F or OOB data. Still, to avoid data conflicts for given E&F or OOB data entered simultaneously by more than one sharing partner, in the above arrangement, each GCC member can share E&F or OOB data only at particular times.

In the above illustrative embodiment, sharing partners may attempt to share data corresponding to the same E&F or OOB asset, and the reported data may be different. For example, a first sharing partner may describe a particular E&F asset as being at first location, while a second sharing partner may describe the same E&F asset as being at a second location. In this illustrative example, if both sharing partners enter their respective E&F data, the system can allow two source sharing partners, each with different data, and the system will not know that the data is essentially the same. In this circumstance, the data tag must identify the source and destination sharing partners, and also must identify the data content in a non-ambiguous fashion. Conventions can be established amongst the sharing partners to name E&F and OOB data entries so that data that is essentially the same can be identified as such.

In all of the above embodiments, where new E&F or OOB data associated with existing shared E&F or OOB data is later collected through intelligence channels associated with a secondary sharing partner that is not the original source sharing partner, the data can be provided to the source partner by the secondary sharing partner via E-mail, or other means, so that the source sharing partner can enter the new data for sharing.

As mentioned above, the different types of data, for example own data, other GCC member data, E&F data, and OOB data can be shared differently from each other. For example, E&F data can be shared from partner A private data memory 20 directly to partner B shared data memory 32 via the write-only data path 66a. Own status data, can be shared from partner A private data memory 20 to partner A shared data memory 22 then to partner B shared data memory 32 via the write-only data path 28a. It will be readily apparent to one of ordinary skill in the art that the other combinations of data types along the two write-only data paths 28, 66 are possible with this invention. It should be further recognized by one of ordinary skill in the art that all data can be shared along only one of the write-only data paths 28, 66.

Hierarchical data of all data types can be shared in the manners described above, with special provisions. For example, an infantry brigade is known to comprise a hierarchy of two infantry battalions or six infantry companies. In one exemplary embodiment, a sharing selection at any level of the hierarchy, for example sharing of infantry battalion data, can cause all data at lower levels to be shared automatically. Infantry companies associated with the infantry battalion can be automatically shared. In another embodiment, only the particular data selected for sharing can be shared. In yet another embodiment, all levels of the hierarchy, both above and below the selected data can be shared.

Figure 2:
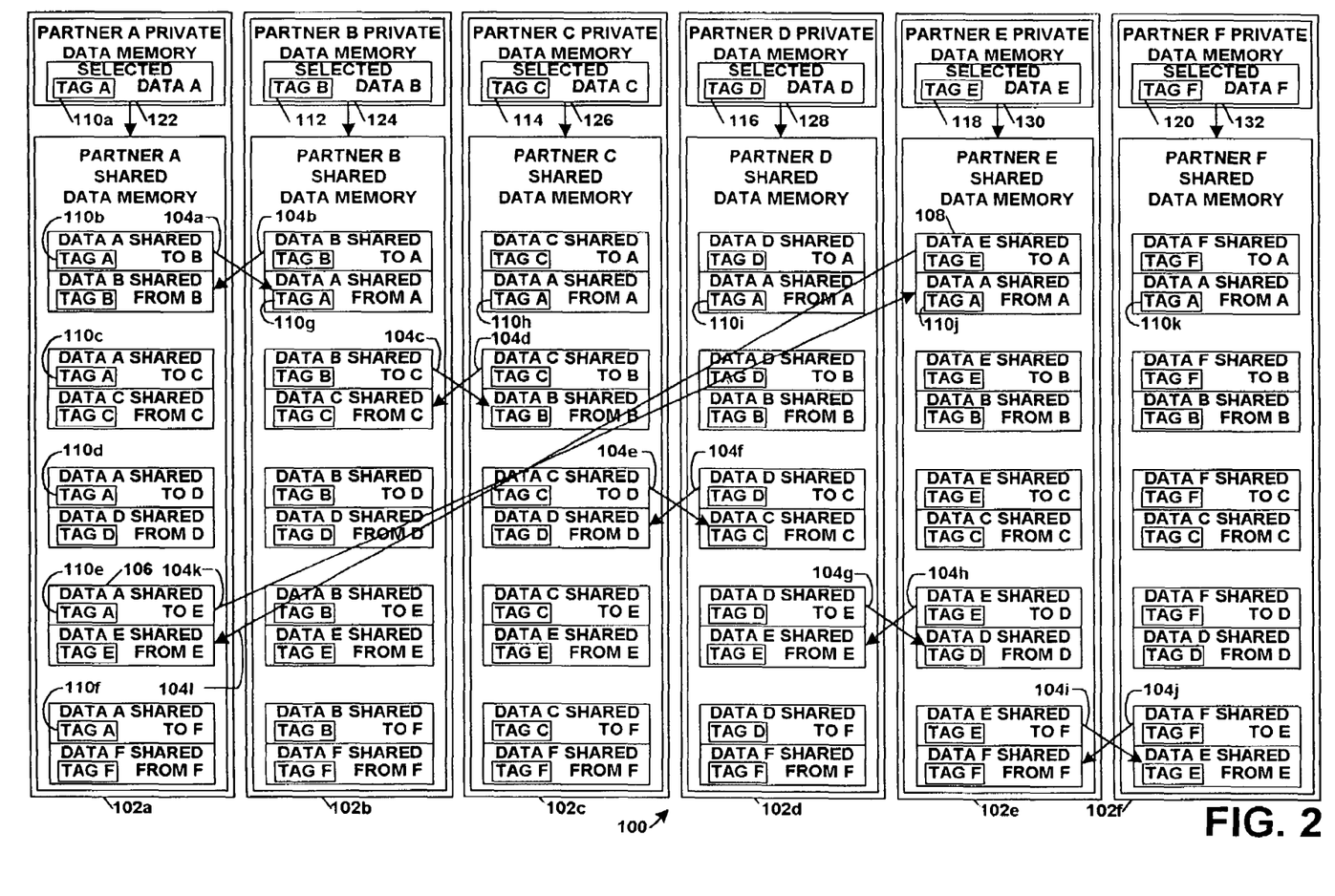
FIG. 2 is a block diagram of a six partner system having secure data sharing indicating a full data sharing in accordance with the present invention.

Now referring to FIG. 2, the servers of six sharing partners 102a–102f are indicated. Client computers are not shown for clarity. In this illustrative embodiment, data A shared to E 106 and data E shared to A 108 are shown as shared between sharing partner A 102a and sharing partner E 102e via write-only data paths 104k, 104l. Data tags associated with the selected data, for example data tag A 110a associated with selected data A 122, indicate the other sharing partners to which the selected data is to be shared. Data tag A 110a thus indicates sharing with partners B, C, D, E, and F, corresponding to copied data 110b–110f. In FIG. 2 each partner has selected to share its selected data 122–132 with all of the other partners as would be indicated in the data tags 110–120 associated with the data. It will be recognized that many "write-only" data sharing paths not explicitly shown with arrows are otherwise shown by labels within the figure.

Figure 3:
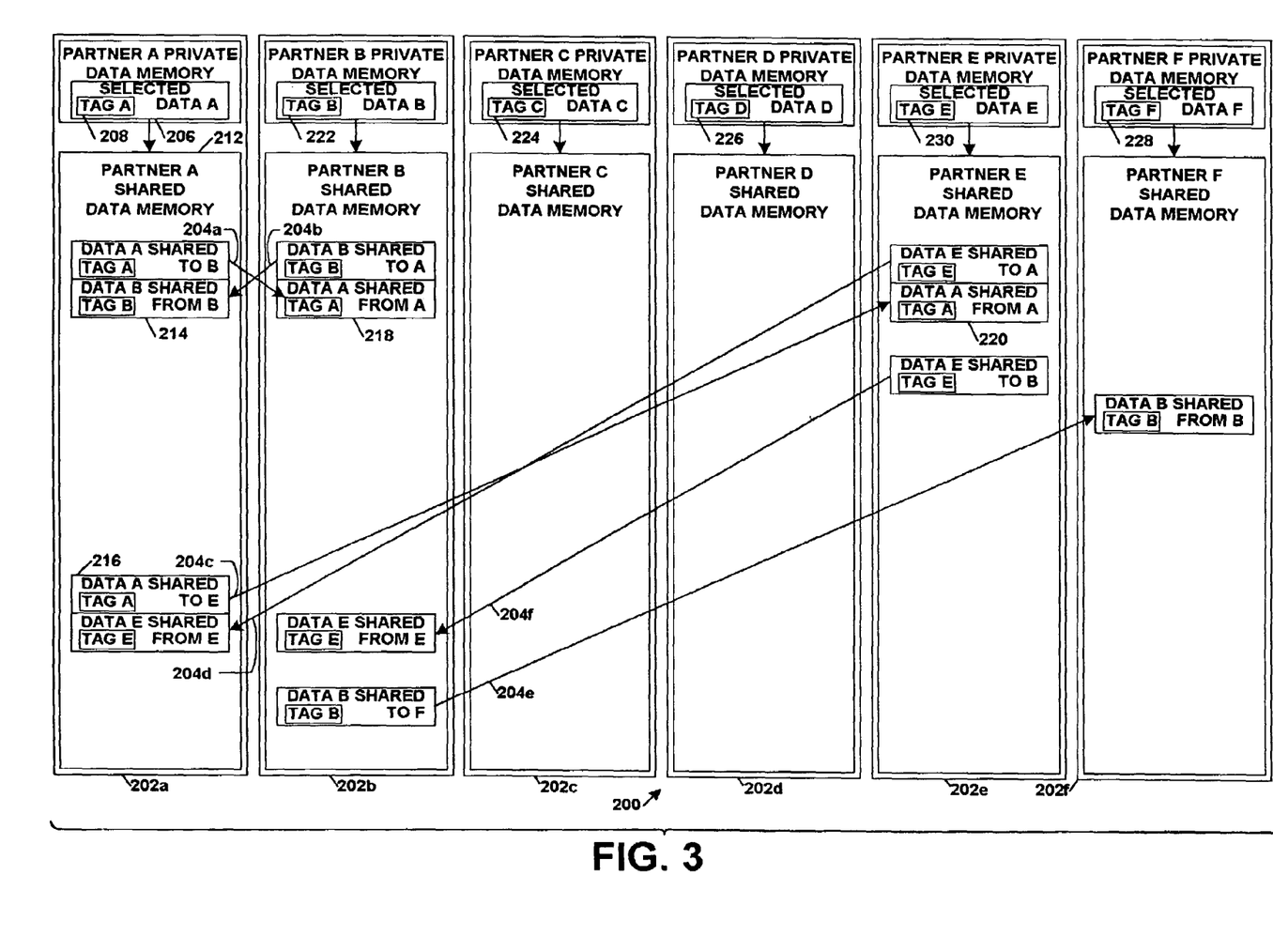
FIG. 3 is a block diagram of a six partner system having secure data sharing indicating a partial data sharing in accordance with the present invention.

Now, referring to FIG. 3, the sharing partners 202a–202f can select to share with fewer than all of the other partners. Selected write-only data paths 204a–204e are indicated. For example, sharing partner A 202a has selected to share selected data A 206 with only the other sharing partner B and E 202b, 202e, as indicated by tag A 208. Thus, selected data A 206 in partner A private data memory 210 is copied to partner A shared memory 212 in two instances 214, 216. Data A shared to B 214 and data A shared to E 216 are replicated to similar data, data A shared from A 218, 220. Similarly, sharing partner B has selected to share with other sharing partners A and F only, as indicated by the data tag B 222; sharing partners C, D, and F 202c, 202d, 202f have chosen to share with no other sharing partners as indicated by respective data tags 224, 226, 228; and sharing partner E has chosen to share with other sharing partners A and B 202a, 202b as indicated by data tag E 230.

Figure 4:
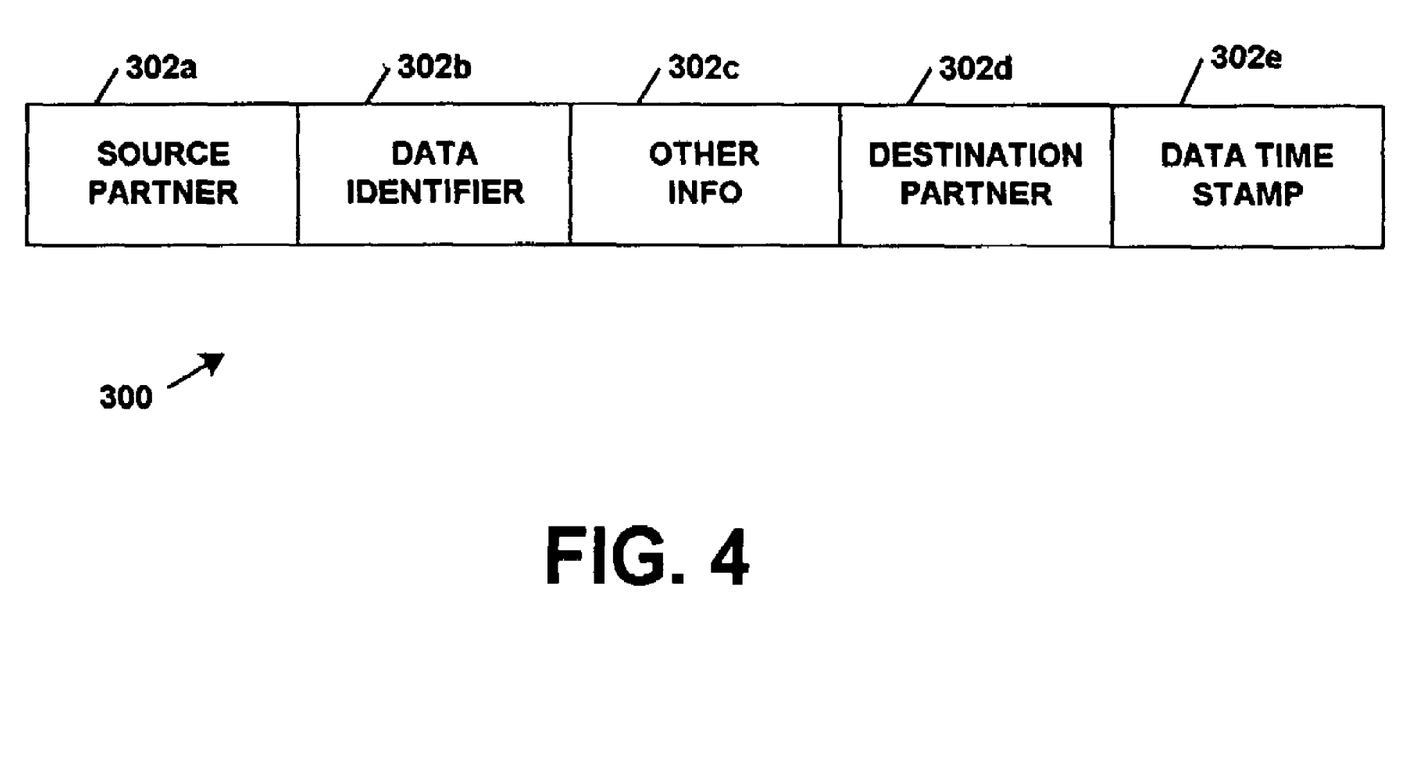
FIG. 4 is a block diagram of an exemplary data tag that can form part of the system of FIGS. 1A, 1B and 2 to 3.

As shown in FIG. 4, the data tag 300 that is associated with selected data can contain tag components 302a–302e that include a source sharing partner 302a, a data identifier 302b, other information 302c to be described below, a destination sharing partner 302d, and a time at which the data was last updated 302e.

In general, the data identifier 302b identifies the data. For example, the data identifier 302b can indicate the unit identifier (ID) and name, the base ID and name, and/or the equipment ID and name. As mentioned above, one use for the data identifier 302b is to uniquely identify E&F data to avoid situations where the various sharing partners may want to share data about the same E&F resource. In one embodiment, once a sharing partner has shared a particular E&F data, the data cannot be updated or entered by any other sharing partner directly. The other information 302c can optionally provide others shared data attributes particular to the selected data, e.g. the number of troops associated with an identified battalion. The date time stamp 302e can indicate the last time that the data was updated to further resolve potential conflicts in which the various sharing partners attempt to share data about the same asset.

It is understood that where the sharing partners utilize different native languages, the contents of the data tags can be mapped into any of the languages without ambiguity and without loss of function. For example, where one partner uses the English language, and another uses the Arabic language, a data identifier 302b, or other data tag component 302, in each of the two languages can be resolved to be the same or different though in different languages.

Figure 5:
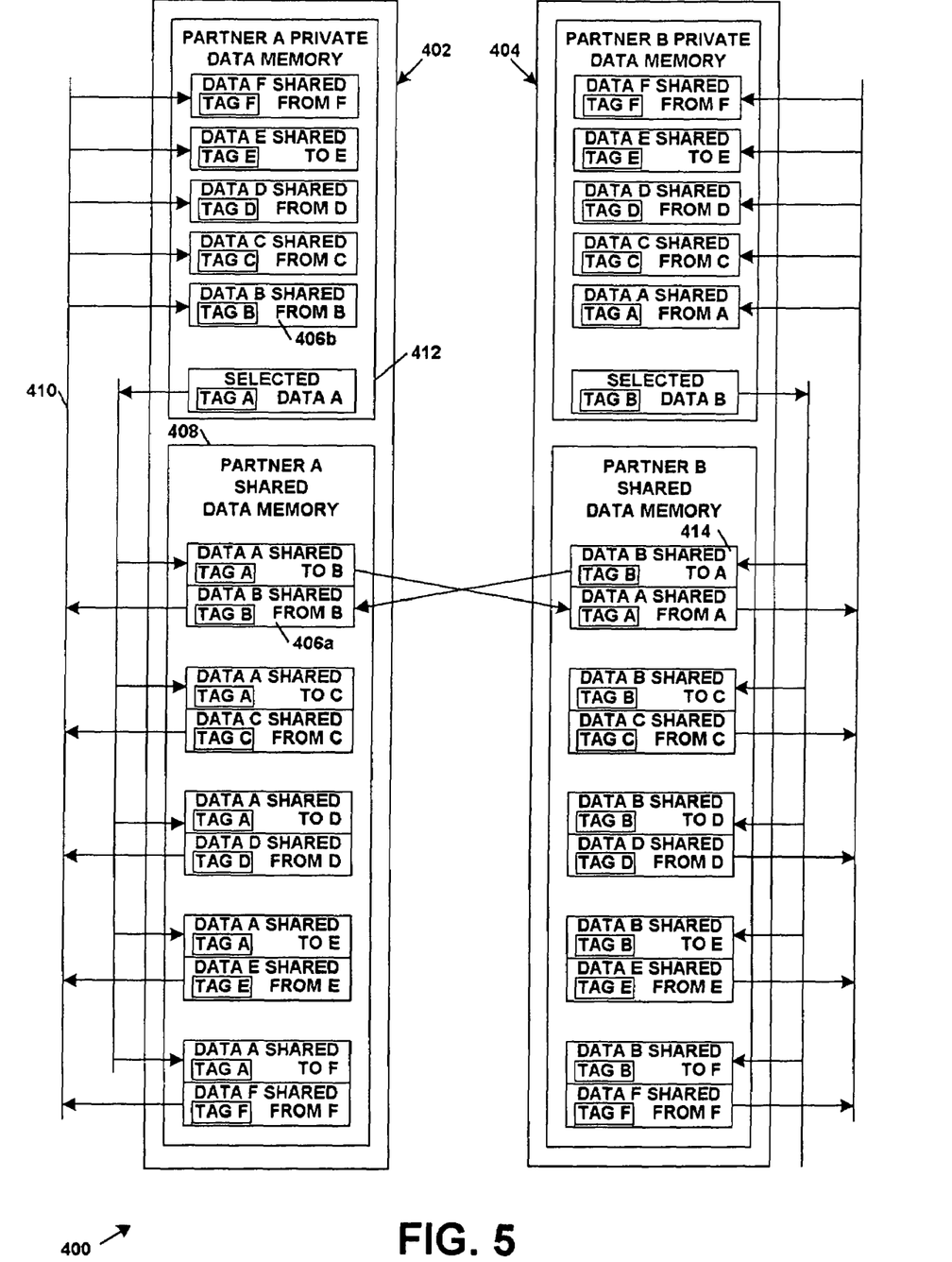
FIG. 5 is a block diagram of a two partner system for secure data sharing indicating an alternative data sharing arrangement in accordance with the present invention.

Now, referring to FIG. 5, an alternate arrangement is shown in which sharing partner A 402 receives data from the various other sharing partners, including sharing partner B 404. As discussed previously, the shared data from other partners, for example data B shared from B 406a, become resident in partner A shared data memory 408. Alternatively, the shared data is not left to be resident only within the shared data memory of each partner. Rather, a copy of the shared data, for example data B shared from B 406b, is provided via a coupling, for example a data bus 410, to partner A private data memory 412. Thus, each partner can keep a private copy of the shared data from the other partners that is not subject to the automatic updates nor the deletions of data mentioned earlier.

A data copy can be created that is not subject to the deletion of shared data by a sharing partner. For example, if sharing partner B 404 wanted to revoke sharing of data B shared to A 414 to data B shared from B 406a, sharing partner B need only write null data to data B shared to A 414, which would then be replicated null data to data B shared from B 406a. If sharing partner A 402 were to have kept a private data copy of data B shared from B 406b, then the data copy 406b can be held private by sharing partner A and would not be subject to sharing withdrawal.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method for data sharing, comprising:
    storing first private data within a first private data memory associated with a first sharing partner, wherein the first private data is accessible to only the first sharing partner;
    selecting a portion of the first private data to provide a first private data portion;
    selecting a second sharing partner associated with the first sharing partner;
    associating the first private data portion with the second sharing partner, wherein the associating the first private data portion with the second sharing partner includes:
        creating a first data tag including one or more of a first sharing partners tag portion associated with the first sharing partner, a selected sharing partners tag portion associated with the second sharing partner, a data identifier tag portion, or a data time identifier tag portion; and
        associating the first data tag with the first private data portion to provide a first private tagged data portion, wherein the first private tagged data portion is accessible to only the first sharing partner;
    pushing, upon initiation by the first sharing partner, data in accordance with the first private tagged data portion from the first sharing partner to the second sharing partner as a first replicated data portion;
    storing second private data within a second private data memory associated with the second sharing partner, wherein the second private data is accessible to only the second sharing partner;
    selecting a portion of the second private data to provide a second private data portion;
    selecting the first sharing partner;
    associating the second private data portion with the first sharing partner, wherein the associating the second private data portion with the first sharing partner includes:
        creating a second data tag including one or more of a second sharing partner tag portion associated with the second sharing partner, a selected sharing partners tag portion associated with the first sharing partner, a data identifier tag portion, or a data time identifier tag portion; and
        associating the second data tag with the second private data portion to provide a second private tagged data portion, wherein the second private tagged data portion is accessible to only the second sharing partner;
    pushing, upon initiation by the second sharing partner, data in accordance with the second private tagged data portion from the second sharing partner to the first sharing partner as a second replicated data portion;
    altering the first private tagged data portion with the first sharing partner; and
    automatically pushing, upon initiation by the first sharing partner, data in accordance with the altered first private tagged data portion from the first sharing partner to the second sharing partner as a respective updated replicated data portion to replace the first replicated data portion.

2. The method of claim 1, wherein the associating the first private data portion with the second sharing partner further includes:
    creating a copy of the first private tagged data portion in a first shared data memory associated with the first sharing partner to provide a first private tagged copied data portion, wherein the first private tagged copied data portion is accessible to only the first sharing partner; and
    associating the first private tagged copied data portion with the second sharing partner indicated by the selected sharing partners tag portion.

3. The method of claim 2, wherein pushing the data in accordance with the first private tagged data portion from the first sharing partner to the second sharing partner includes pushing, upon initiation by the first sharing partner, the first private tagged copied data portion from the first shared memory to a second shared data memory associated with the second sharing partner to provide the first replicated data portion.

4. The method of claim 3, further including altering at least one of the first private data portion, the data tag, the first private tagged data portion, the first private tagged copied data portion, or the first replicated data portion.

5. The method of claim 4, wherein altering the data tag further includes selecting the second sharing partner with a graphical user interface associated with the data tag and the first sharing partner.

6. The method of claim 5, wherein the selecting the second sharing partner includes altering the selected sharing partners tag portion with the graphical user interface.

7. The method of claim 3, further including automatically updating, upon initiation by the first sharing partner, at least one of the first private tagged data portion, the first private tagged copied data portion, or the first replicated data portion in accordance with the first private data portion concurrently with an alteration of the first private data portion by the first sharing partner.

8. The method of claim 1, wherein pushing the data in accordance with the first private tagged data portion from the first sharing partner to the second sharing partner includes pushing, upon initiation by the first sharing partner, the first private tagged data portion from the first private data memory to a shared data memory associated with the second sharing partner to provide the first replicated data portion.

9. The method of claim 8, further including automatically updating, upon initiation by the first sharing partner, at least one of the first private tagged data portion and the first replicated data portion in accordance with the first private data portion concurrently with alteration of the first private data portion by the first sharing partner.

10. The method of claim 8, further including automatically updating the first private tagged data portion and the first replicated data portion in accordance with the first private data portion concurrently with alteration of the first private data portion by the first sharing partner.

11. The method of claim 1, wherein the first sharing partner and the second sharing partner are associated with military allies, and the first and second private data portion corresponds to military data.

12. The method of claim 11, wherein the military allies are located in different countries.

13. A data sharing apparatus comprising:
 a first sharing partner including:
  a first client computer; and
  a first sharing partner server coupled to the first client computer, wherein the first sharing partner server includes a first private data memory having a first private data portion, wherein the first private data portion is accessible to only the first sharing partner, and wherein the first private data portion is tagged with one or more of a first sharing partner tag portion associated with the first sharing partner, a selected sharing partners tag portion associated with the second sharing partner, a data identifier tag portion, or a data time identifier tag portion to provide a first private tagged data portion accessible to only the first sharing partner; and
 a second sharing partner including:
  a second client computer; and
  a second sharing partner server coupled to the second client computer, wherein the second sharing partner server includes a second private data memory having a second private data portion, wherein the second private data portion is accessible to only the second sharing partner, wherein the second private data portion is tagged with one or more of a second sharing partner tag portion associated with the second sharing partner, a selected sharing partners tag portion associated with the first sharing partner, a data identifier tag portion, or a data time identifier tag portion to provide a second private tagged data portion accessible to only the second sharing partner, and wherein the first sharing partner is adapted to push, upon initiation by the first sharing partner, data in accordance with the first private tagged data portion to the second sharing partner as a first replicated data portion, wherein the first replicated data portion is accessible to the second sharing partner, and wherein the second sharing partner is adapted to push, upon initiation by the second sharing partner, data in accordance with the second private tagged data portion to the first sharing partner as a second replicated data portion, wherein the second replicated data portion is accessible to the first sharing partner.

14. The data sharing apparatus of claim 13, wherein the first sharing partner server further includes a first shared data memory adapted to receive, upon initiation by the first sharing partner, a first private tagged copied data portion in accordance with the first private tagged data portion, wherein the first private tagged copied data portion is accessible to only the first sharing partner, and the second sharing partner server further includes a second shared data memory adapted to receive, upon initiation by the first sharing partner, the first replicated data portion in accordance with the first private tagged copied data portion from the first shared data memory.

15. The data sharing apparatus of claim 13, wherein the second sharing partner server further comprises a shared data memory adapted to receive, upon initiation by the first sharing partner, the first replicated data portion in accordance with the first private tagged data portion from the first private data memory.

16. The data sharing apparatus of claim 13, wherein the first sharing partner and the second sharing partner are associated with military allies, and the first private data portion corresponds to military data.

17. The data sharing apparatus of claim 16, wherein the military allies are in different countries.

* * * * *

UNITED STATES PATENT AND TRADEMARK OFFICE
CERTIFICATE OF CORRECTION

PATENT NO. : 7,185,066 B2
APPLICATION NO. : 09/975423
DATED : February 27, 2007
INVENTOR(S) : Noble et al.

It is certified that error appears in the above-identified patent and that said Letters Patent is hereby corrected as shown below:

Column 5, lines 33-34 delete "interface 38, 52," and replace with --interfaces 38, 52,--.

Column 5, line 52 delete "partner A and B" and replace with --partner A and partner B--.

Column 6, line 11 delete "bidirectional," and replace with --bi-directional,--.

Column 6, lines 56-57 delete "of through a manual" and replace with --or through a manual--.

Column 8, lines 15-16 delete "partner B and E" and replace with --partner B and partner E--.

Column 9, line 38 delete "partners tag" and replace with --partner tag--.

Signed and Sealed this

Fifteenth Day of April, 2008

JON W. DUDAS
*Director of the United States Patent and Trademark Office*